United States Patent Office 2,725,132
Patented Nov. 29, 1955

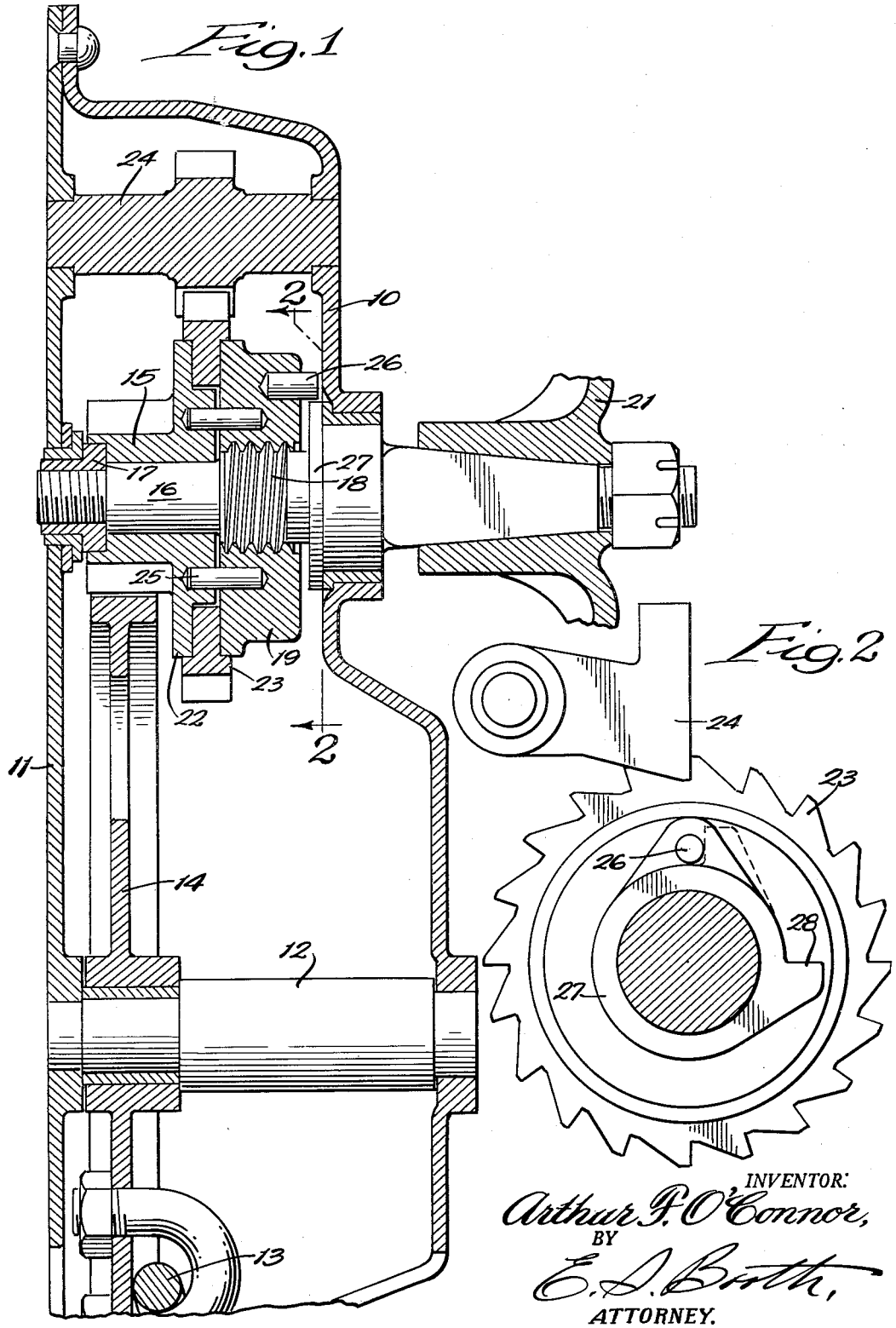

2,725,132

HAND BRAKE MECHANISM

Arthur F. O'Connor, Chicago, Ill., assignor to Union Asbestos & Rubber Company, Chicago, Ill., a corporation of Illinois Application February 23, 1951, Serial No. 212,306

3 Claims. (Cl. 192—16)

This invention relates to a hand-brake mechanism for railway cars, and more particularly to a mechanism of the type in which free spinning of the handwheel is prevented during releasing of the brake.

Handwheel mechanisms of the non-spinning type have been proposed in which rotation of the wheel shaft engages and disengages a friction clutch associated with a one-way ratchet, and through which the shaft is connected to the brake-operating pinion. In these mechanisms, if the wheel is turned excessively in the brake-releasing direction, after the brake has been fully released the clutch mechanism may jam in its disengaged position, making it difficult to re-engage the brake. It is one of the objects of the present invention to provide a hand-brake mechanism in which rotation of the wheel-shaft relative to the clutch mechanism is limited in the brake-releasing direction.

Another object is to provide a hand-brake mechanism in which the rotation-limiting means is effective only during turning of the wheel in the brake-releasing direction and is ineffective when the wheel is turned in the brake-engaging direction.

A further object is to provide a hand-brake mechanism which is simple in construction and which employs a simple but highly effective means to prevent relative rotation between the pinion and the clutch pressure ring.

The above and other objects and advantages of the invention will be more readily apparent from the following description when read in connection with the accompanying drawing, in which:

Figure 1 is a cross-section through a brake mechanism embodying the invention, and Figure 2 is a partial section on the line 2—2 of Figure 1.

In the illustrated construction the mechanism is contained in and supported by a housing 10, which is rigidly connected to a back plate 11 which may be mounted on the end of a railway car or the like. The housing supports a shaft 12 which functions as a drum for the brake-applying chain partially indicated at 13. The end of the chain is rigidly connected to a gear 14 rotatable on the shaft 12 so that when the pinion is turned the chain will be wound about the shaft to apply the brake, and when the pinion is turned in the opposite direction the chain will be unwound to release the brake.

The gear 14 meshes with a pinion 15 which is freely rotatable on a shaft 16. The shaft 16 is formed with a reduced end to receive a stop collar 17, which engages the pinion 15 to limit axial movement thereof and which may be journaled in the back plate 11. Spaced from its inner end, the shaft is formed with a threaded portion 18 threadably receiving a clutch pressure ring 19. The shaft projects through the housing 10 to receive a handwheel partially shown at 21, through which the shaft may be turned to apply and release the brake.

The pinion is formed with an outwardly-extending flange 22 facing the inner surface of the pressure ring 19, and an annular ratchet wheel 23 is mounted with a flange thereon lying between the flange 22 and the pressure ring.

The ratchet 23 is held against rotation in one direction by a pawl 24 having a shaft thereon journaled in the back plate and the housing.

The pinion and the pressure ring 19 are held against relative rotation, but are enabled to slide axially relative to each other by means of a plurality of elongated cylindrical pins 25 slidably fitted into registering bores in the faces of the pinion and the pressure ring. With this construction, when the handwheel is turned and the pinion is held against rotation by the load on the gear 14, the pressure ring will also be held so that it will positively be moved axially by the threads 18 to engage or disengage the clutch. When the handwheel is turned in a clockwise direction looking from the right of Figure 1, the pressure ring will be urged toward the pinion frictionally to grip the ratchet 23. Continued movement of the wheel will cause the parts to jam together so that the pinion will be turned to turn the gear and engage the brake. When the handwheel is released the ratchet will continue to be gripped by the pinion and pressure ring and will hold the parts against reverse rotation so that the brake will remain engaged.

To disengage the brake the handwheel is turned in the opposite direction so that the pressure ring will be moved away from the ratchet and pinion to release the frictional grip on the ratchet. At this time the pinion can turn in a reverse direction due to the tension on the chain, but can never overrun the handwheel so that the handwheel cannot spin. During this operation the pinion will follow up movements of the handwheel, but if the pinion tends to overrun the handwheel the clutch parts will again engage the ratchet to stop it.

If the handwheel is turned excessively in the release direction, as occasionally happens, the flat outer surface of the pressure ring will jam against a flat flange or collar 27 on the shaft. If these parts jam together sufficiently tight the pressure ring will thereafter turn with the shaft and will not shift over into engagement with the ratchet 23 so that the ratchet will be ineffective and a dangerous condition will exist.

To prevent this condition stop means are provided to limit turning of the shaft in the release direction relative to the pressure ring. As shown, the stop means comprises a short pin 26 projecting from the outer face of the pressure ring 19. The shaft 16 carries a collar 27 adjacent to the pressure ring, which is formed with a projecting shoulder 28 thereon. When the handwheel is turned in the brake-releasing direction, which is counter-clockwise as seen in Figure 2, the shoulder 28 will engage the stop pin 26 to limit turning of the shaft relative to the pressure ring before the pressure ring can be moved to a point where it might jam against the collar 27. When the handwheel is turned in the opposite direction to engage the brake if more than one revolution is required to engage the clutch parts, the pressure ring will have moved axially a sufficient distance so that the projecting shoulder 28 will clear the end of the pin 26. Therefore turning of the handwheel and shaft in the brake-engaging direction is not limited, so that engagement of the clutch parts is ensured.

A hand brake mechanism similar to that disclosed in the present application is disclosed and claimed in my copending application Serial No. 126,886, filed November 12, 1949, now abandoned.

While one embodiment of the invention has been shown and described in detail, it will be understood that this is illustrative only and is not to be taken as a definition of the scope of the invention, reference being had for this purpose to the appended claims.

What is claimed is:

1. A handbrake mechanism for railway cars, comprising a supporting housing, a shaft journaled in the housing and having a threaded portion thereon, a handwheel secured to the shaft to turn it, a pinion freely rotatable on the shaft, means connecting the pinion to a brake, a stop member on the shaft to limit axial movement of the pinion away from the threaded portion, a pressure ring threaded on the threaded portion the pressure ring and shaft having substantially flat facing surfaces thereon which tend to jam together when the pressure ring is moved away from the pinion, an annular one-way ratchet member having a clutch part lying between the pinion and the pressure ring to be gripped thereby, means connecting the pressure ring and pinion to hold them against relative rotation, and stop means on the pressure ring and the shaft to limit relative rotation therebetween said stop means including parts on the pressure ring and shaft having surfaces lying in radial planes including the shaft axis and which will engage when the shaft is turned in a direction to move the pressure ring away from the pinion to prevent jamming of said surfaces.

2. A handbrake mechanism for railway cars, comprising a supporting housing, a shaft journaled in the housing and having a threaded portion thereon, a handwheel secured to the shaft to turn it, a pinion freely rotatable on the shaft, means connecting the pinion to a brake, a stop member on the shaft to limit axial movement of the pinion away from the threaded portion, a pressure ring threaded on the threaded portion, the pressure ring and shaft having substantially flat facing surfaces thereon which tend to jam together when the pressure ring is moved away from the pinion, an annular one-way ratchet member having a clutch part lying between the pinion and the pressure ring to be gripped thereby, means connecting the pressure ring and pinion to hold them against relative rotation, a stop pin projecting from the pressure ring, and a collar on the shaft formed with a projection to engage the stop pin and limit relative rotation of the shaft and pressure ring in a direction to move the pressure ring away from the pinion to prevent jamming of said surfaces.

3. A handbrake mechanism for railway cars, comprising a supporting housing, a shaft journaled in the housing and having a threaded portion thereon, a handwheel secured to the shaft to turn it, a pinion freely rotatable on the shaft, means connecting the pinion to a brake, a stop member on the shaft to limit axial movement of the pinion away from the threaded portion, a pressure ring threaded on the threaded portion the pressure ring and shaft having substantially flat facing surfaces thereon which tend to jam together when the pressure ring is moved away from the pinion, an annular one-way ratchet member having a clutch part lying between the pinion and the pressure ring to be gripped thereby, means connecting the pressure ring and pinion to hold them against relative rotation, a stop pin projecting from the face of the pressure ring opposite to the pinion, and a collar on the shaft having a projecting shoulder to engage the pin to limit relative rotation of the shaft and pressure ring in a direction to move the ring away from the pinion to prevent jamming of said surfaces, the pin being short enough to clear the projecting shoulder when the shaft turns relative to the pressure ring in the opposite direction.

References Cited in the file of this patent
UNITED STATES PATENTS

| | | |
|---|---|---|
| 810,227 | Shem | Jan. 16, 1906 |
| 884,777 | Thomas | Apr. 14, 1908 |
| 2,310,135 | Van Cleave | Feb. 2, 1943 |